(12) United States Patent
Tooman

(10) Patent No.: US 7,458,804 B2
(45) Date of Patent: Dec. 2, 2008

(54) INJECTION MOLDING DROP TIP

(75) Inventor: Patrick A. Tooman, Clarkston, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 358 days.

(21) Appl. No.: 10/981,211

(22) Filed: Nov. 4, 2004

(65) Prior Publication Data

US 2006/0093703 A1     May 4, 2006

(51) Int. Cl.
*B29C 45/20* (2006.01)

(52) U.S. Cl. .................. 425/549; 264/328.15; 425/572

(58) Field of Classification Search ................. 425/549, 425/572; 264/328.15
See application file for complete search history.

(56) References Cited

U.S. PATENT DOCUMENTS

| | | | |
|---|---|---|---|
| 4,173,448 A | | 11/1979 | Rees et al. |
| 4,666,396 A | * | 5/1987 | Shaw ......................... 425/549 |
| 4,810,184 A | | 3/1989 | Gellert et al. |
| 4,964,795 A | * | 10/1990 | Tooman ....................... 425/572 |
| 5,353,673 A | * | 10/1994 | Lynch ......................... 84/398 |
| 5,378,138 A | | 1/1995 | Onuma et al. |
| 5,470,219 A | | 11/1995 | Yokoyama et al. |
| 5,783,234 A | | 7/1998 | Teng |
| 5,820,803 A | | 10/1998 | Hashimoto |
| 5,834,041 A | | 11/1998 | Sekine et al. |
| 5,840,231 A | | 11/1998 | Teng |
| 5,879,727 A | * | 3/1999 | Puri ........................... 425/549 |
| 5,919,492 A | | 7/1999 | Tarr et al. |
| 5,969,280 A | * | 10/1999 | Marcinkiewicz ............. 84/398 |
| 6,086,357 A | | 7/2000 | Steil et al. |
| 6,099,767 A | | 8/2000 | Tarr et al. |
| 6,129,541 A | | 10/2000 | Takeda |
| 6,179,604 B1 | | 1/2001 | Takeda |
| 6,294,122 B1 | | 9/2001 | Moss et al. |
| 6,343,925 B1 | | 2/2002 | Jenko |
| 6,464,909 B1 | | 10/2002 | Kazmer et al. |
| 6,514,440 B1 | | 2/2003 | Kazmer et al. |
| 6,638,049 B1 | | 10/2003 | Moss et al. |
| 2002/0102323 A1 | * | 8/2002 | Ihara et al. .................. 425/549 |
| 2003/0155672 A1 | | 8/2003 | Kazmer et al. |
| 2005/0031728 A1 | | 2/2005 | Babin et al. |

FOREIGN PATENT DOCUMENTS

| | | |
|---|---|---|
| DE | 44 08 683 C2 | 7/2003 |
| EP | 0 995 574 B1 | 5/2003 |
| GB | 2397796 | 8/2004 |
| JP | 2-289320 | 11/1990 |
| JP | 3159720 | 4/2001 |
| WO | WO 03/080315 A1 | 10/2003 |

* cited by examiner

*Primary Examiner*—Tim Heitbrink
(74) *Attorney, Agent, or Firm*—Bliss McGlynn, P.C.

(57) ABSTRACT

A drop tip is provided for conveying injection molding material from a molding material supply into a mold. The drop tip has a body including an internal bore and a drop passage extending from the internal bore. The internal bore has an arcuate lower end terminating in a gate to prevent retention of molten material therein.

19 Claims, 2 Drawing Sheets

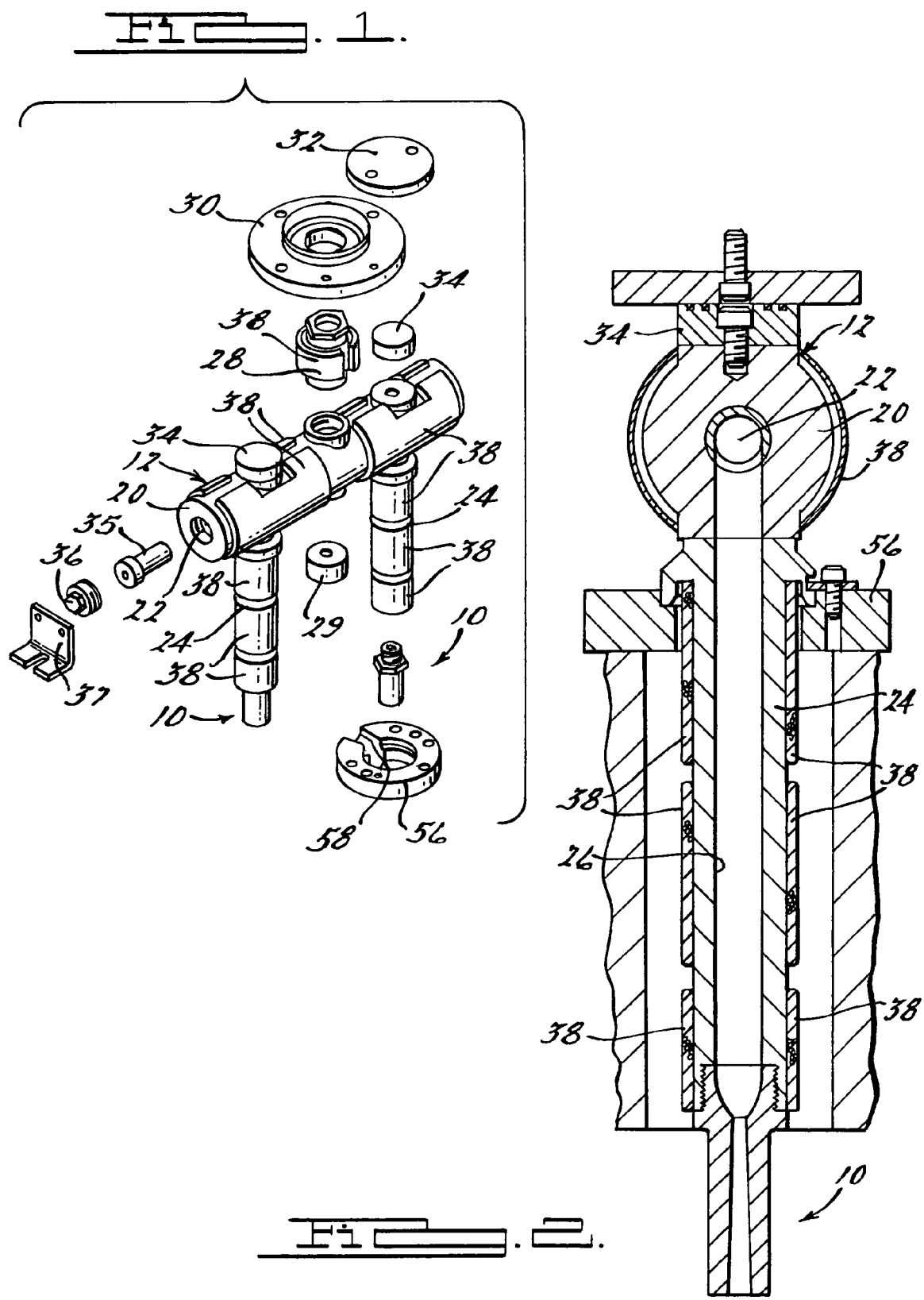

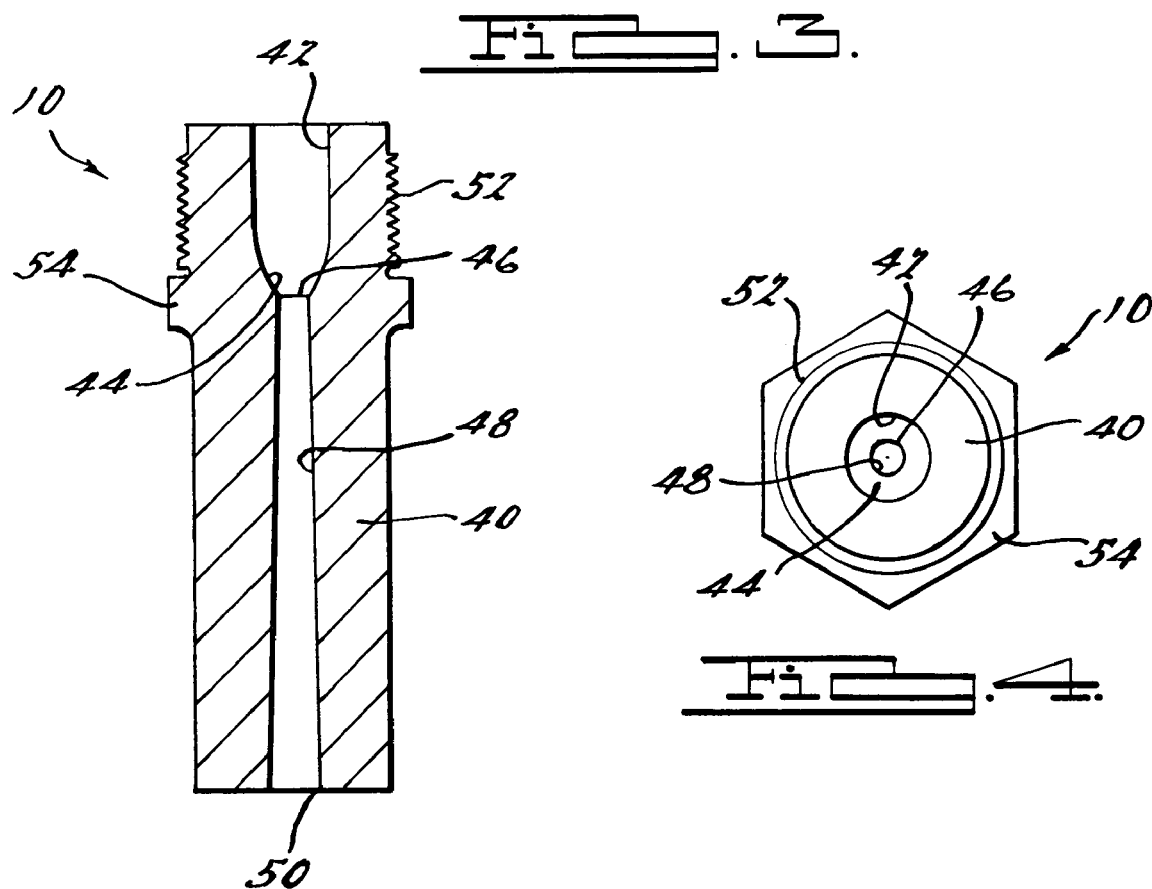
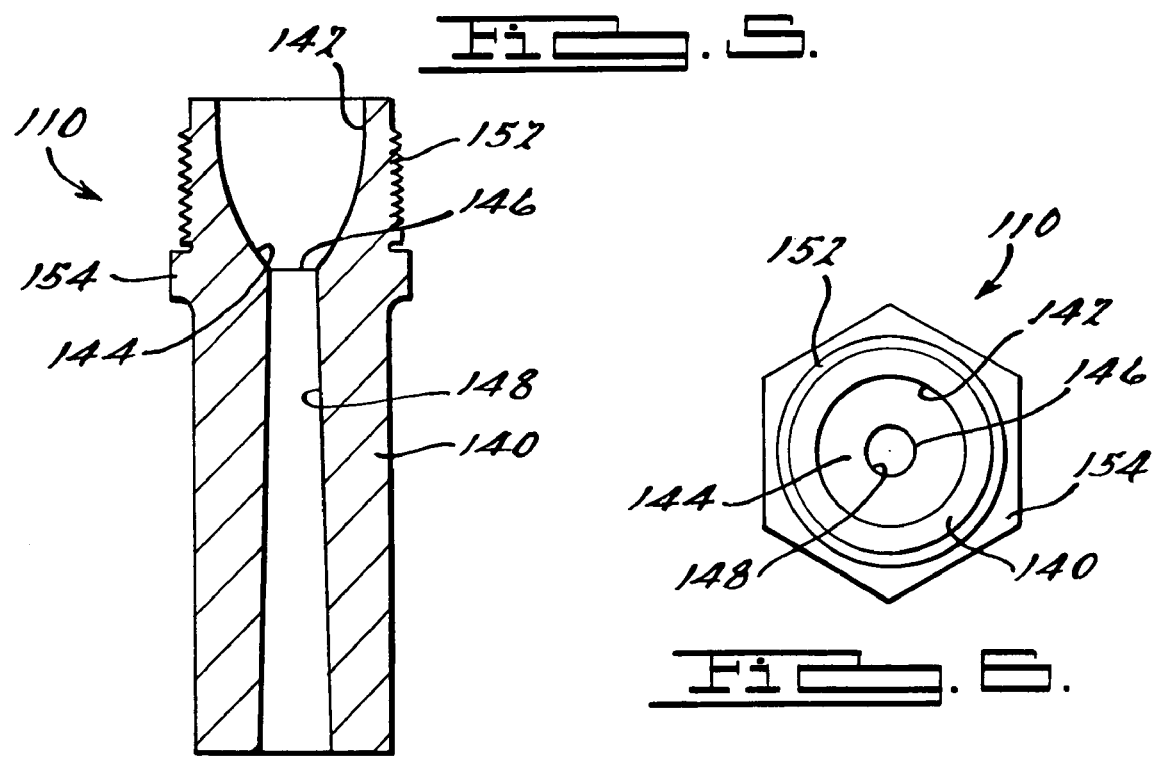

INJECTION MOLDING DROP TIP

BACKGROUND OF THE INVENTION

1. Field of the Invention

The present invention relates generally to injection molding and, more particularly, to a drop tip for injection molding.

2. Description of the Related Art

Injection molding is a widely known manufacturing process used to produce a variety of parts. Injection molding involves introducing a molten material, for example a molten plastic or resin, into a cavity within a mold until the cavity is filled. The molten material hardens in the mold in the shape of inner surfaces of the cavity. After the molten material hardens or cures, the hardened or cured material is removed from the cavity.

For injection molding, a manifold assembly is typically used for conveying molten material from a central injection portion or sprue to a number of cavities or to multiple points within one large cavity of the mold. An example of such a manifold assembly is disclosed in U.S. Pat. No. 4,964,795 to Tooman. In that patent, a manifold assembly has an integral or one piece, cast or steel, cylindrical or rectangular manifold with a passageway and at least one nozzle extending outwardly from the manifold and having a passageway through which a molten material may pass. The terminal end of the passageway of the nozzle, called a gate, is in fluid communication with the cavity of the mold. The nozzle may fluidly communicate with a drop tip attached thereto and passes through the mold or terminates in the mold. The drop tip has an internal bore that is generally straight or linear from its inlet to an outlet thereof.

It is also known that the manifold assembly may be used to mold colored plastic parts. Typically, the manifold assembly is used to mold the plastic part with a first color and then with a second color. However, the internal bore of the drop tip retains a portion of the first color prior to molding the second color. During the injection molding process, the first few parts molded will have a mix of the first color and the second color, resulting in scrap parts.

Therefore, it is desirable to provide a drop tip that has an internal bore that reduces or eliminates the retention of plastic material. It is also desirable to provide a drop tip for molding multiple colored parts that eliminates mixing of the colors during the molding process. It is further desirable to provide a drop tip for molding colored plastic parts that minimizes or eliminates scrap due to a change of colors as a result of the molding process. Therefore, there is a need in the art to provide a drop tip that meets these desires.

SUMMARY OF THE INVENTION

Accordingly, the present invention is a drop tip for conveying injection molding material from a molding material supply into a mold. The drop tip has a body including an internal bore and a drop passage extending from the internal bore. The internal bore has an arcuate lower end terminating in a gate to prevent retention of molten material therein.

One advantage of the present invention is that a drop tip is provided having a new internal bore for molding of multiple colored parts. Another advantage of the present invention is that the drop tip has an internal bore that eliminates retention of plastic material in the internal bore. Yet another advantage of the present invention is that the drop tip has an internal bore that reduces or eliminates mixing of colors for multiple color injection molding of parts. Still another advantage of the present invention is that the drop tip has an internal bore for molding colored plastic parts that minimizes or eliminates scrap due to a change of colors as a result of the molding process.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a fragmentary perspective view of a drop tip, according to the present invention, illustrated in operational relationship with a manifold assembly.

FIG. 2 is an enlarged fragmentary elevational view of the drop tip and a portion of the manifold assembly of FIG. 1.

FIG. 3 is an enlarged fragmentary elevational view of the drop tip of FIGS. 1 and 2.

FIG. 4 is a plan view of the drop tip of FIG. 3.

FIG. 5 is an enlarged fragmentary view of another embodiment, according to the present invention, of the drop tip of FIG. 1.

FIG. 6 is a plan view of the drop tip of FIG. 5.

DESCRIPTION OF THE PREFERRED EMBODIMENT(S)

Referring to the drawings, and in particular FIGS. 1 and 2, one embodiment of a drop tip 10, according to the present invention, is shown for a manifold assembly, generally indicated at 12. The manifold assembly 12 is used for conveying an injection molding material from a molding material supply such as an injection molding machine (not shown) through the drop tip 10 and into a mold (not shown) for molding a part. The mold has a cavity (not shown) therein. It should be appreciated that a molten material (not shown) is introduced into the cavity via the drop tip 10.

The manifold assembly 12 includes a manifold 20 having a manifold flow passage 22. The manifold assembly 12 also includes as least one, preferably a plurality of drops or nozzles 24 extending downwardly from the manifold 20 and having a nozzle flow passage 26 fluidly communicating with the manifold flow passage 22. The flow passages 22 and 26 can be of any appropriate shape. The nozzle flow passage 26 narrows and terminates at the drop tip 10. The manifold assembly 12 further includes a sprue bushing 28 and a sprue bushing spacer 29 connected to the manifold 20 for facilitating the introduction of molten material into the manifold 20. It should be appreciated that more than one nozzle 24 may be used with the manifold assembly 12, only one nozzle 24 is used with one drop tip 10 of the manifold assembly 12. It should also be appreciated that the molten material may be of a plastic, metal, wood fibers and plastic, etc. and is injected into the sprue bushing 28 of the manifold 20 from a molding machine (not shown). It should further be appreciated that the manifold assembly 12 is conventional and known in the art.

The manifold assembly 12 includes at least one, preferably a plurality of manifold spacers 34 connected to the manifold 20 opposite the nozzles 24. The manifold assembly 12 also includes at least one drop end plug 35 disposed in the manifold passageway 22 of the manifold 20 adjacent each nozzle 24 and a fastener 36 such as a set screw threadably engaging the manifold 20 to secure the drop end plug 35 in the manifold passageway 22 of the manifold 20. It should be appreciated that manifold assembly 12 may include at least one bracket 37 connected to the manifold 20 for mounting the manifold assembly 12 to the mold.

The manifold assembly 12 also includes at least one, preferably a plurality of electrical heaters 38 in the form of heater bands removably disposed about the circumference of the manifold 20 as well as the nozzles 24 and sprue bushing 28 to supply heat to maintain the plastic at a specified or predetermined temperature. The heaters 38 are formed as two half cylinders electrically wired in parallel to an electrical source such as a junction box (not shown). The half cylinders of the heaters 38 are removably clamped about the circumference of the manifold 20, nozzles 24, and sprue bushing 28 using conventional clamping fasteners or the like (not shown).

Referring to FIGS. 3 and 4, the drop tip 10 includes a body 40 at the end of each of the nozzles 24. The body 40 has an internal bore or cavity 42 for receiving a lower end of the nozzle 24. The internal bore 42 extends axially therein and is generally circular in cross-sectional shape. The internal bore 42 has a lower end 44 that is generally arcuate in shape and terminates in a gate or orifice 46. The orifice 46 is generally circular in cross-sectional shape. The internal bore 42 has a predetermined diameter ranging from 0.125 inches to 1.00 inches and the orifice 46 has a predetermined diameter ranging from 0.14 inches to 0.375 inches. The predetermined diameter of the orifice 46 is smaller than the predetermined diameter of the internal bore 42. The body 40 has a drop passage 48 extending axially between the orifice 46 and an outlet 50 formed through the lower end thereof. The drop passage 48 is generally circular in cross-sectional shape and is tapered outwardly from the inlet to the outlet 50. In one embodiment, the drop passage 48 is tapered at a predetermined angle and distance such as 1.193 degrees and one half inch per foot or larger. The drop passage 48 fluidly communicates with the internal bore 42. The body 40 also has an upper threaded portion 52 for a function to be described. The body 40 further has a tool portion 54 disposed axially between the threaded portion 52 and the lower portion of the body 40 to allow a tool to engage the body 40. The body 40 is made of a metal material. The body 40 is a monolithic structure being integral, unitary, and one-piece.

The manifold assembly 12 may include at least one, preferably a plurality of drop locators 56. The drop locators 56 are in the form of a titanium or stainless steel insulating ring disposed about each of the drop tips 10 for locating the drop tip 10 relative to the mold and inhibiting the heat transfer between each drop tip 10 and the cavity of the mold. The drop locator 56 has an aperture 58 extending axially therethrough to receive the nozzle 24 and drop tip 10. The drop locator 56 is made of a metal material. The drop locator 56 is a monolithic structure being integral, unitary, and one-piece. It should be appreciated that the drop locator 56 is retained to the mold by suitable means such as fasteners.

In operation, a first colored molten material is injected at high temperatures and pressures into the manifold 20 through the sprue bushing 28. The first colored molten material then flows along the central flow passage 22 of the manifold 20 to the nozzles 24. The first colored molten material then flows through the nozzle passages 26. When this occurs, the first colored molten material flows through the internal bore 42, gate 46, and drop passage 48 of the drop tip 10 to the mold to mold a part (not shown). It should be appreciated that throughout the injection process, the heaters 38 maintain the molten material at a specified temperature, which is monitored by sensors (not shown).

After the first colored molten material is discontinued, a second colored molten material is molded. The second colored molten material then flows along the central flow passage 22 of the manifold 20 to the nozzles 24. The second colored molten material then flows through the nozzle passages 26. The second colored molten material flows through the internal bore 42 toward the gate 46. When this occurs, the second colored molten material flows through the gate 46 and the arcuate surface of the lower end 44 of the internal bore 42 causes any residue from the first colored molten material to flow upward away from the gate 46. The second colored molten material then flows through the drop passage 48 of the drop tip 10 to the mold to further mold the part. It should be appreciated that a multiple of colors of molten material may be used to mold the part.

Referring to FIGS. 5 and 6, another embodiment, according to the present invention, of the drop tip 10 is shown. Like parts of the drop tip 10 have like reference numerals increased by one hundred (100). In this embodiment, the drop tip 110 includes the body 140 having the internal bore 142 with the lower end 144 and the gate 146. The body 140 also has the drop passage 148 with the outlet 150, threaded portion 152, and tool portion 154. In this embodiment, the internal bore 142 has a predetermined diameter larger than the predetermined diameter of the internal bore 42 of the drop tip 10. The operation of the drop tip 110 is similar to the drop tip 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An injection molding drop tip for conveying injection molding material from a molding material supply into a mold, said drop tip comprising:

a body including an internal bore and a single tapered drop passage extending axially from said internal bore;

said internal bore having an upper end and extending axially to a lower end terminating in a single gate to prevent retention of molten material therein, said internal bore having an axial length less than an axial length of said drop passage; and wherein said body has a wall forming said internal bore and extending axially from said upper end to said lower end, said wall having a continuous arcuate internal surface extending from said upper end of said internal bore to said lower end of said internal bore to prevent retention of molten material in said internal bore when molten material flows through said gate by causing any residue from the molten material to flow upward away from said gate.

2. A drop tip as set forth in claim 1 wherein said internal bore is of a first predetermined diameter.

3. A drop tip as set forth in claim 2 wherein said gate is of a second predetermined diameter less than said first predetermined diameter.

4. A drop tip as set forth in claim 2 wherein said first predetermined diameter is in the range of about 0.25 inches to about 0.75 inches.

5. A drop tip as set forth in claim 3 wherein said second predetermined diameter is in the range of about 0.14 inches to about 0.25 inches.

6. A drop tip as set forth in claim 1 wherein said internal bore extends axially into said body.

7. A drop tip as set forth in claim 1 wherein said drop passage extends axially from said gate to an outlet thereof.

8. A drop tip as set forth in claim 7 wherein said drop passage is tapered from said gate to the outlet thereof.

9. A drop tip as set forth in claim 1 wherein said body includes a threaded portion.

10. A drop tip as set forth in claim 9 wherein said body includes a tool engaging portion disposed axially between said threaded portion and an outlet of said drop passage.

11. A manifold assembly for conveying injection molding material from a molding material supply into a mold, said manifold assembly comprising:
    a manifold including a manifold flow passage extending therealong;
    at least one nozzle extending outwardly from said manifold to a distal end, said at least one nozzle including a nozzle flow passage extending from and in fluid communication with said manifold flow passage; and
    at least one drop tip including a body having a threaded portion threadably engaging said distal end of said at least one nozzle and an internal bore in fluid communication with said nozzle flow passage, said internal bore having an upper end and extending axially to a lower end terminating in a single gate to prevent retention of molten material therein; and
    wherein said internal bore has an a continuous arcuate internal surface extending from said upper end of said internal bore to said lower end of said internal bore to prevent retention of molten material in said internal bore when molten material flows through said gate by causing any residue from the molten material to flow upward away from said gate.

12. A manifold assembly as set forth in claim 11 wherein said at least one drop tip includes a drop passage extending axially from said internal bore.

13. A manifold assembly as set forth in claim 11 wherein said internal bore is of a first predetermined diameter.

14. A manifold assembly as set forth in claim 13 wherein said gate is of a second predetermined diameter less than said first predetermined diameter.

15. A manifold assembly as set forth in claim 12 wherein said internal bore extends axially into said body.

16. A manifold assembly as set forth in claim 12 wherein said drop passage extends axially from said gate to an outlet thereof.

17. A manifold assembly as set forth in claim 16 wherein said drop passage extends axially from said gate to an outlet thereof.

18. A manifold assembly as set forth in claim 12 wherein said body includes a tool engaging portion disposed axially between said threaded portion and an outlet of said drop passage.

19. An injection molding drop tip comprising:
    a body including a threaded portion for threadably engaging a lower end of a nozzle and an internal bore extending axially therein for communicating with a flow passage of a nozzle and a single drop passage extending axially from said internal bore to an outlet thereof and being tapered from said internal bore to the outlet, said internal bore having an axial length less than an axial length of said drop passage; and
    said internal bore being of a first predetermined diameter and having an upper end and extending axially to a lower end terminating in a single gate of a second predetermined diameter less than said first predetermined diameter to prevent retention of molten material therein;
    wherein said body has a wall forming said internal bore and extending axially from said upper end to said lower end, said wall having a continuous arcuate internal surface extending from said upper end of said internal bore to said lower end of said internal bore to prevent retention of molten material in said internal bore when molten material flows through said gate by causing any residue from the molten material to flow upward away from said gate; and
    a tool engaging portion disposed axially between said threaded portion and an outlet of said drop passage.

* * * * *

UNITED STATES PATENT AND TRADEMARK OFFICE
CERTIFICATE OF CORRECTION

PATENT NO. : 7,458,804 B2 Page 1 of 1
APPLICATION NO. : 10/981211
DATED : December 2, 2008
INVENTOR(S) : Patrick A. Tooman It is certified that error appears in the above-identified patent and that said Letters Patent is hereby corrected as shown below:

On the Title Page, under "U.S. Patent Documents": insert --5,350,288 A 09/1994 Kimoto et al.--.

Column 2, line 49 insert --while-- between "that" and "more".

Column 2, line 65 insert --the-- between "that" and "manifold".

Column 5, line 22 delete "an" between "has" and "a".

Column 6, lines 5 - 6 delete "extends axially from said gate to an outlet thereof" and insert therefor --is tapered from said gate to the outlet thereof--.

Signed and Sealed this

Second Day of June, 2009

JOHN DOLL
*Acting Director of the United States Patent and Trademark Office*